Sept. 1, 1964  W. S. ROBSON  3,147,193

NUCLEAR REACTOR FUEL ELEMENTS

Filed March 2, 1961

INVENTOR
William Selwyn Robson
BY
Larson and Taylor

United States Patent Office 3,147,193
Patented Sept. 1, 1964

3,147,193
NUCLEAR REACTOR FUEL ELEMENTS
William Selwyn Robson, Lymm, England, assignor to
United Kingdom Atomic Energy Authority, London,
England
Filed Mar. 2, 1961, Ser. No. 92,933
Claims priority, application Great Britain Mar. 2, 1960
2 Claims. (Cl. 176—77)

This invention relates to nuclear reactor fuel elements and to attachments therefor.

Gas-cooled nuclear reactors having vertically-orientated fuel element channels in each of which fuel elements are stacked in a column in end-to-end relationship, are known. Each known fuel element has end attachments enabling adjacent elements in each column to engage and locate with one another. Such end attachments may comprise cups and cones and the end attachments or the fuel elements themselves may also incorporate laterally extending members for assisting in centering the fuel elements in their channels. The said members necessarily are a loose fit within the channels to allow the fuel elements to be charged and discharged and also to allow for a certain amount of distortion of the fuel elements due to irradiation and thermal cycling. It has now been found that, for certain designs of heat transfer finning of the fuel element sheaths and in certain operating conditions of coolant flow and pressure, vibration of the fuel elements laterally in the channels can occur and can result in damage thereto.

It is an object of the present invention to provide means whereby coolant-flow-induced vibration of fuel elements in channels is restrained.

According to the invention, a nuclear reactor fuel element of elongate form and capable of being disposed in a vertical fuel element channel in a gas-cooled nuclear reactor has an end fitting provided with three fixed radially projecting arms, two of said arms being of fixed effective radial length and the third arm comprising a movable portion and resilient means for acting on said movable portion so as to tend to extend the effective radial length of the arm.

The invention also consists in a fuel element end fitting as aforesaid, and furthermore consists in a column of stacked fuel elements in a fuel element channel and each provided at one or both of its ends with a fitting as aforesaid and stabilised by engagement of its said arms with the channel wall.

Figure 1:
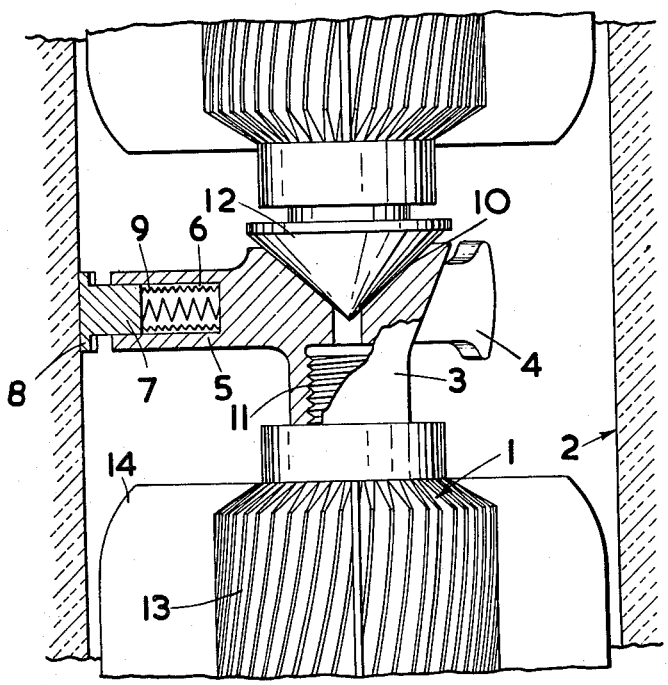
Figure 2:
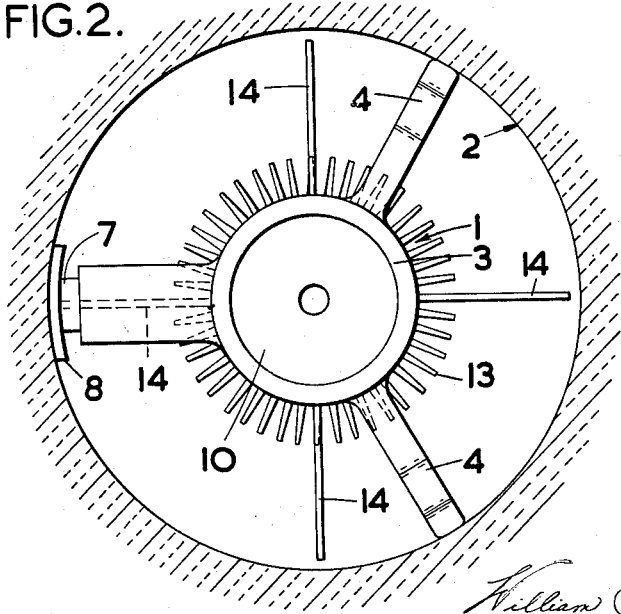

A constructional example embodying the invention will now be described with reference to the accompanying more or less diagrammatic drawings, wherein:

FIGURE 1 is a fragmentary front elevation, and
FIGURE 2 is a plan view thereof.

Referring to the drawings, in the construction shown therein, as applied by way of example to a fuel element 1 of elongate form and having helical heat transfer fins 13 and four equi-spaced longitudinal flow splitters 14, the element 1 being disposed with other similarly provided fuel elements in a stacked column in a vertical fuel element channel 2 of a gas-cooled nuclear reactor in which refuelling is from the top face of the moderator, the fuel element 1 has a fitting 3 secured by screwing to a screwthreaded spigot 11 of the fuel element sheath at its upper end, the fitting 3 having two radially extending arms 4 disposed at 120° to each other and able, when the fuel element 1 is centrally disposed in the channel 2, to contact the wall of the latter. A radially extending member 5 is disposed at 120° to the arms 4 and is tubular over most of its length, providing an axial bore 6 within which is disposed a cylindrical plunger 7 having at its outer end a shoe 8 for contacting the wall of the channel 2. The plunger 7 is urged outwardly so that its shoe 8 contacts the said wall by means of a resilient member, conveniently a spring loaded bellows 9 secured to the plunger 7, a leak path (not shown) being provided so that the plunger can be moved inwardly against the action of the bellows 9 by application of a steady inward force applied to the plunger 7, whereas transient forces are resisted not only by the action of the spring loaded bellows but also by the cushion of gas within the bellows 9. The fitting 3 has a cup-shaped recess 10 adapted to be engaged by and located with a cone 12 at the lower end of the next fuel element above the element 1 in the stacked column.

In operation, the fuel element 1 is loaded into position by a fuel element handling grab (not shown) provided with means for holding the plunger 7 in its inwardly retracted position against the action of the spring loaded bellows 9. On removal of the grab, the plunger 7 is released and moves outwardly, urged by the spring loaded bellows 9, until the shoe 8 contacts and presses against the wall of the channel 2. The top of the fuel element 1 is moved by the pressure exerted from an off-centre position to a centered position in which the arms 4 also contact the channel wall, the element 1 being then stabilised against lateral vibration due to flow of coolant along the channel 2. The bottom cone of the succeeding fuel element to be loaded engages the cup-shaped recess 10 which stabilises the lower end of that element. On discharging, the fuel element grab moves the plunger 7 inwardly against the action of the spring loaded bellows 9 with leakage through the leak path, enabling the fuel element 1 to be moved off-centre, to cause the arms 4 to clear the channel wall, and then to be lifted.

In a modification (not shown), the bellows are not spring loaded and no leak path is provided, pressure of gas within the bellows being sufficient to urge the plunger 7 outwardly until the shoe 8 contacts the channel wall and to hold the shoe 8 in its contacting position against transient forces tending to produce vibration. The force exerted by the grab must then be sufficient to move the plunger 7 inwardly against the resistance of the gas within the bellows by an amount sufficient to allow charging and discharging of the fuel element without interference.

I claim:

1. A nuclear reactor fuel element of elongate form for disposition in a vertical fuel element channel in a gas-cooled nuclear reactor, an end fitting provided at at least one end of the fuel element, said end fitting having three fixed radially projecting arms, two of said arms being of fixed effective radial length, the third arm being shorter than either of said two arms and having a bore therein with an open end, a plunger member slidable in said bore and including a shoe member on its outer end, and a spring loaded bellows within the bore secured to the inner end of said plunger and bearing against the closed end of the bore for extending the effective radial length of said third arm.

2. A nuclear reactor fuel element as set forth in claim 1 wherein said end fitting is provided at the upper end of the fuel element, said fuel element furher including a substantially cone-shaped projection extending longitudinally from its lower end, and said end fitting further including a longitudinally centered substantially cone-shaped depression on its upper end for receiving a cone-shaped projection of another fuel element when stacked in a vertical fuel element channel of a gas-cooled nuclear reactor.

References Cited in the file of this patent

UNITED STATES PATENTS

| | | |
|---|---|---|
| 711,966 | Hendrick | Oct. 28, 1902 |
| 2,885,335 | Moore et al. | May 5, 1959 |
| 2,949,415 | Stubbs et al. | Aug. 16, 1960 |
| 2,983,662 | Shillitto et al. | May 9, 1961 |

FOREIGN PATENTS

| | | |
|---|---|---|
| 213,799 | Australia | Mar. 6, 1958 |
| 563,703 | Belgium | July 3, 1958 |
| 1,063,290 | Germany | Aug. 13, 1959 |
| 1,223,823 | France | Feb. 1, 1960 |